3,015,564
FEED CONTAINING AN ARSENICAL AND
POLYVINYLPYRROLIDONE
Vernon Dawe, Highland Park, Ill., assignor to Dawe's Laboratories, Inc., Chicago, Ill., a corporation of Illinois
No Drawing. Filed Mar. 4, 1959, Ser. No. 797,010
3 Claims. (Cl. 99—2)

This invention relates to animal feed and more particularly to a new and improved animal feed for stimulating the rate of growth and weight gain of animals, such as poultry and the like domesticated animals generally raised as sources of meat.

It is an object of this invention to produce and to provide a method for producing a new and improved feed for domesticated meat animals, such as poultry, cattle, swine, lambs and the like. It is a related object to produce an animal feed which is effective to improve the rate of growth of the animal and the amount of growth per unit weight of feed devoured by the animal.

Another object of this invention is to increase the nutritional efficiency of feed supplied to domesticated animals so that lesser weight units of feed are required to produce a unit weight of animal thereby to enhance the economics with respects to the use of meat as a food product for human consumption.

The science of nutrition in animal feed has been well advanced over the past several years. It is recognized that for health and for a good rate of growth, it is desirable to make use of a feed containing a proper balance between carbohydrates, proteins, fats and minerals. In addition, the function of selected accessory factors, such as vitamins, hormones and antibiotics, for example, is also universally appreciated such that domesticated meat animals, including poultry feeds, are formulated to contain such supplements as vitamin A, vitamin D, vitamin E, riboflavin, pantothenic acid, niacin, and vitamin $B_{12}$; small quantities of antibiotics, such as penicillin, streptomycin, bacitracin or one of the tetracyclines; and sometimes with hormones, such as diethylstilbestrol.

The scientific formulation of animal feeds has led to noticeable improvements in the rate of weight gain and in feed efficiency or the amount of gain per unit weight of feed. For example, as long as ten years ago, where it was customary to develop a 3-pound broiler chicken in 11 weeks from date of hatching with a consumption of about 3¼ pounds of feed per pound of weight gain, it is now common to develop a 3-pound broiler in about 9 weeks from the date of hatching with a feed consumption of only 2½ pounds of the improved feed per pound of weight gain.

Because of the importance of meat as a food product and to the national economy, research and investigation continue to be conducted in the development of new and improved accessory factors, supplements and feed compositions with a view towards achieving further efficiencies in the feed from the standpoint of the rate of growth and in the amount of growth per unit weight of feed.

I have discovered that the rate of growth in the domesticated animals, and especially poultry, can be promoted and accelerated and that the efficiency of utilization of the feed consumed by such means can be increased when a compound capable of being identified as polyvinylpyrrolidone is added to the diet of the domesticated animal or poultry or when polyvinylpyrrolidone is incorporated in desirable amounts in the feed.

Polyvinylpyrrolidone, hereinafter referred to as PVP, is a compound well known to the chemical art, including plastics, as a polymer form of a monomer represented by the formula:

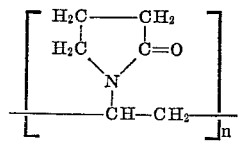

It has been found that PVP is effective to increase the rate of growth and the gain in weight of poultry and other domesticated meat animals when present in the feed in an amount within the range of 0.01 to 0.2% by weight of the feed composition and preferably when present in an amount of 0.05% by weight of the feed. The molecular weight of the PVP is not important but excellent results have been secured from the use of polymers which are commercially available having a molecular weight average within the range of 40,000 to 360,000.

To the present, PVP has found use in various medicinal preparations for human administration, such as an intensifier of the activity of ACTH when administered in combination therewith for arthritis and the like; an extender for nontoxic blood plasma; as an extender of the action of such drugs as procaine, insulin, penicillin, salicylate and the like. Such usage indicates that PVP can be taken internally without undesirable effect whereby it becomes safe to incorporate PVP in animal feeds to secure the described and unexpected nutritional advantages.

As illustrative of the results obtained when PVP is embodied as a component in animal feed, in accordance with the practice of this invention, the following nutritional evaluations were made with turkey poults. The birds used in this evaluation were all one-day old, broad-breasted bronze poults. Each group tested contained 12 poults of similar weights, separately raised in screen-floored batteries under carefully controlled experimental conditions for elimination of as many variables as possible.

The following represents the basal diets in which the components are set forth in parts by weight:

| Components | Starter Composition | Prestarter Composition |
|---|---|---|
| Ground yellow corn | 920 | 725 |
| Dehulled soybean oil meal (50% protein) | 750 | 700 |
| Dried milk with vitamins and antibiotics added (Vitamelk) | 100 | 200 |
| Menhaden fish meal | | 100 |
| Meat and bone scraps (50% protein) | 100 | 100 |
| Dehydrated alfalfa leaf meal | 50 | 100 |
| Penicillin feed supplement (4 grams procaine penicillin per pound on calcium carbonate carrier) | | 25 |
| Dicalcium phosphate | 50 | 40 |
| Salt | 10 | 10 |
| Calcium carbonate | 20 | 0 |
| | 2,000 | 2,000 |

Group 1—Group 1 of 12 birds were fed on the starter diet only as a control.

Group 2—Group 2 of 12 birds were fed on the starter diet with 0.05% by weight PVP (M.W. 40,000).

Group 3—This group of 12 birds were fed on the prestarter diet only as a control.

Group 4—This group of 12 birds were fed on the prestarter diet with 0.05% by weight PVP added.

At the age of four weeks, it was found that the average weight of the 12 birds of group 1 (starter only) was 604 grams whereas the average weight of the 12 birds in group 2 (0.05% PVP) was 626 grams or a gain of 3.6% in weight due to the presence of PVP in the feed. The amount of feed consumed by the birds of group 1 was 1.62 grams per gram of final weight whereas the birds of group 2 consumed only 1.57 grams per gram of final weight. The birds of group 3 had an average weight of 685 grams whereas the birds of group 4 had an average weight of 711 grams, an increase of 3.8% due to the presence of PVP.

The foregoing represents a significant weight increase in the use of feed containing PVP by comparison with the controls of the same feed composition without PVP. A clear indication of increased feed efficiency is also obtained. While the foregoing illustrates the improvements obtained in feed for turkeys, similar results have also been secured with chickens and with mammals or domesticated meat animals.

It has been further found that PVP provides beneficial use, not only as a growth stimulant and to increase feed efficiency, but that it is capable also of counteracting some of the undesirable effects of toxic agents incorporated into feeds for various medicinal purposes. For example, the addition of 3-nitro-4-hydroxyphenyl arsonic acid is often incorporated into poultry feed to combat certain diseases. Such arsonic or poisonous compounds impose a stress on poults because of excessive arsenic intake. This stress level is reflected in a marked reduction in the weight gain of the animal and a marked reduction in the rate of weight gain. This and the effect of the combination which includes PVP in accordance with the practice of this invention can be illustrated by the following:

Group 5—This group of 12 birds, similar to the birds of groups 1 to 4, were fed on the same starter diet with 3-nitro-4-hydroxyphenyl arsonic acid added in the amount of 0.0198% by weight.

Group 6—This group of 12 birds were raised on the feed of group 5 with 0.05% by weight PVP added.

When the birds were four weeks old, the average weight of the birds of group 5 was found to be 446 grams and the average weight of the birds of group 6 was found to be 526 grams. It will be noted that a considerable drop occurred between 604 grams of group 1 and the 446 grams of group 5 which is responsible to the presence of the 3-nitro-4-hydroxyphenyl arsonic acid. It will be observed further that the addition of PVP in the feed of group 6 was effective to increase the weight from 446 grams in group 5 to 526 grams in group 6—a gain of 17.9%. The amount of feed consumed by the birds of group 5 was 1.78 grams per gram of final weight as compared to 1.54 grams per gram of final weight of the birds of group 6. This is indicative of an increase in the amount of feed consumed in the presence of arsonic acid compound and it is evidence further of a significant decrease when PVP is present, even to a level below that of group 1 without the arsenic.

It will be significant that this detoxifying effect of PVP and the embodiment in the efficiency and weight gain of the feed are obtainable when PVP is administered orally with the feed. The effectiveness of this route of administration can also be used against the other poisonous or other deleterious materials incorporated in feed and for other species.

The PVP used in the described turkey growth tests had an average molecular weight of about 40,000. Polymers of PVP ranging in average molecular weight of 40,000 to 360,000 gives substantially similar stimulation of growth and improvement in feed efficiency.

The PVP is commercially available as a dry powder or in aqueous solutions usually containing from 20 to 45% solids. Either the powder or the aqueous solution of PVP can be mixed for uniform distribution in the feed. Since PVP is compatible with the feed ingredients, including the vitamins, antibiotics and trace minerals, no particular precautions are necessary for the incorporation other than to mix the feed sufficiently to secure a uniform distribution of the active ingredients.

PVP exhibits a desirable growth stimulation and improvement of feed efficiency when it is used in feeds at relatively low concentrations, such as at concentrations as low as from about 0.01% by weight. Good results have been obtained consistently when present in a concentration of about 0.05% by weight of the feed. While more than 0.2% by weight PVP can be used in the feed, the improvement does not justify the increased costs.

The use of PVP, in accordance with the practice of this invention, is applicable to a wide variety of feeds. For example, it is applicable to chick starting and growing rations, to swine feeds, cattle feeds and the like. The favorable effect of PVP is noted with all practical rations for poultry and for domesticated meat animals.

It will be understood changes may be made with respect to the formulation, method of incorporation and feed without departing from the spirit of the invention especially as defined in the following claims.

I claim:
1. An animal feed containing 3-nitro-4-hydroxyphenyl arsonic acid and polyvinylpyrrolidone present in an amount within the range of 0.01 to 0.2% by weight of the feed to detoxify the arsonic acid compound and to stimulate the growth characteristics of the feed.
2. The method of stimulating the growth of the meat animal by feeding the animal a toxic arsenical for combating an ailment comprising feeding the animal on a diet which embodies polyvinylpyrrolidone in combination with the toxic material whereby the arsenical compound is detoxified.
3. The method as claimed in claim 2 in which the polyvinylpyrrolidone is present in an amount within the range of 0.01 to 0.2% by weight of feed.

References Cited in the file of this patent

UNITED STATES PATENTS

| | | |
|---|---|---|
| 2,658,045 | Schildknecht | Nov. 3, 1953 |
| 2,675,341 | Shalanski | Apr. 13, 1954 |
| 2,767,094 | Frieden | Oct. 16, 1956 |
| 2,906,622 | Lewis | Sept. 29, 1959 |

OTHER REFERENCES

American Dyestuff Reporter, vol. 43, No. 6, Mar. 15, 1954, page 27(a).